(12) United States Patent
Boccuccia et al.

(10) Patent No.: US 11,625,672 B2
(45) Date of Patent: Apr. 11, 2023

(54) UNATTENDED PARCEL DELIVERY SERVICE

(71) Applicant: Ford Global Technologies, LLC, Dearborn, MI (US)

(72) Inventors: Daniel Boccuccia, San Francisco, CA (US); Zachary David Nelson, San Mateo, CA (US); Jennifer L. Brace, San Jose, CA (US); Lindsay Chan, Oakland, CA (US); Shant Tokatyan, Glendale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 552 days.

(21) Appl. No.: 16/620,397

(22) PCT Filed: Dec. 1, 2016

(86) PCT No.: PCT/US2016/064477
§ 371 (c)(1),
(2) Date: Dec. 6, 2019

(87) PCT Pub. No.: WO2018/101951
PCT Pub. Date: Jun. 7, 2018

(65) Prior Publication Data
US 2021/0097486 A1 Apr. 1, 2021

(51) Int. Cl.
*G06Q 10/08* (2012.01)
*G01C 21/34* (2006.01)
(Continued)

(52) U.S. Cl.
CPC ... *G06Q 10/08355* (2013.01); *G01C 21/3415* (2013.01); *G06K 19/06028* (2013.01);
(Continued)

(58) Field of Classification Search
CPC ......... G06Q 10/08355; G06Q 10/0832; G06Q 30/0185; G06Q 2240/00; G06Q 10/0833;
(Continued)

(56) References Cited

U.S. PATENT DOCUMENTS

| 7,778,773 B2 | 8/2010 | Yaqub et al. |
| 2003/0125963 A1 | 7/2003 | Haken |

(Continued)

FOREIGN PATENT DOCUMENTS

| CN | 106104638 B | 11/2016 |
| JP | 2012121700 A | 6/2012 |
| WO | 2016127289 A1 | 8/2016 |

OTHER PUBLICATIONS

Cardrops web page <http://www.cardrops.com/> (<http://web.archive.org/web/20151127025339/http://www.cardrops.com/> captured on Wayback Machine on Nov. 27, 2015) (Year: 2015).*

(Continued)

*Primary Examiner* — Jeff Zimmerman
*Assistant Examiner* — Brian A Tallman
(74) *Attorney, Agent, or Firm* — Brandon Hicks; Eversheds Sutherland (US) LLP

(57) ABSTRACT

A method for parcel delivery service that permits secure and timely delivery of items to unattended vehicles. The method includes receiving an order to deliver an item to a vehicle. A current location of the vehicle may be determined using vehicle identification information. After the vehicle has been located, the item may be authenticated at the vehicle, and access to the interior of the vehicle may be automatically provided to enable the vehicle to securely receive the item. A corresponding system is also disclosed and claimed herein.

19 Claims, 9 Drawing Sheets

(51) Int. Cl.
*G06K 19/06* (2006.01)
*G07C 5/00* (2006.01)
*G06K 7/10* (2006.01)
*G06Q 10/0835* (2023.01)
*G06Q 10/0832* (2023.01)
*G06F 16/9537* (2019.01)
*G06K 7/14* (2006.01)
*B60R 25/20* (2013.01)
*G06Q 30/00* (2012.01)
*G06Q 30/018* (2023.01)

(52) U.S. Cl.
CPC ... *G06K 19/06037* (2013.01); *G06Q 10/0832* (2013.01); *G07C 5/008* (2013.01); *B60R 25/20* (2013.01); *G06F 16/9537* (2019.01); *G06K 7/10861* (2013.01); *G06K 7/1413* (2013.01); *G06K 7/1417* (2013.01); *G06K 2007/10504* (2013.01); *G06Q 30/0185* (2013.01); *G06Q 2240/00* (2013.01)

(58) Field of Classification Search
CPC .... G06Q 10/08; B60R 25/20; G01C 21/3415; G06F 16/9537; G06K 7/10861; G06K 7/1413; G06K 7/1417; G06K 19/06028; G06K 19/06037; G06K 2007/10504; G07C 5/008
USPC .................................................. 705/13, 333
See application file for complete search history.

(56) References Cited

U.S. PATENT DOCUMENTS

| | | | | |
|---|---|---|---|---|
| 2007/0257774 | A1* | 11/2007 | Stumpert | G06Q 10/08 340/7.1 |
| 2011/0173041 | A1* | 7/2011 | Breitenbach | B67D 7/348 705/26.1 |
| 2012/0030133 | A1 | 2/2012 | Rademaker | |
| 2014/0180959 | A1* | 6/2014 | Gillen | G06Q 10/0833 705/341 |
| 2015/0242811 | A1* | 8/2015 | Gillen | G06Q 10/0838 705/338 |
| 2015/0269521 | A1 | 9/2015 | Knapp | |
| 2015/0324744 | A1* | 11/2015 | Fokkelman | G06Q 10/08 705/336 |
| 2015/0332531 | A1* | 11/2015 | Davidsson | E05B 47/0001 70/256 |
| 2015/0370251 | A1* | 12/2015 | Siegel | G05D 1/00 701/2 |
| 2016/0098876 | A1 | 4/2016 | Oz et al. | |
| 2016/0189098 | A1 | 6/2016 | Beaurepaire et al. | |
| 2016/0342943 | A1* | 11/2016 | Wiechers | G06Q 10/0833 |
| 2017/0017920 | A1* | 1/2017 | Stark | B60R 25/24 |
| 2017/0323258 | A1* | 11/2017 | Semsey | H04W 12/06 |
| 2018/0240067 | A1* | 8/2018 | Oz | G07C 9/00182 |

OTHER PUBLICATIONS

Etherington, "Daimler begins testing Smart car trunk delivery service with DHL" <http://web.archive.org/web/20160903084103/https://techcrunch.com/2016/09/02/daimler-begins-testing-smart-car-trunk-delivery-service-with-dhl/> captured on Sep. 3, 2016 using Wayback Machine. (Year: 2016).*

Popken, "Amazon Tests Delivery To Your Car Trunk", Apr. 23, 2015, NBC News, (<http://web.archive.org/web/20150424053152/https://www.nbcnews.com/web/20150424053152/http://www.nbcnews.com/business/autos/amazon-testing-delivery-your-car-trunk-n346886> captured using Wayback Machine on Apr. 24, 2015) (Year: 2015).*

European Office Action for EP Application No. 16923099.2 dated Feb. 14, 2022 (9 pages).

CN Patent Application No. 2016800920167 Office Action dated Nov. 17, 2022.

EP Patent Application No. 16923099.2 Office Action dated Nov. 22, 2022.

* cited by examiner

UNATTENDED PARCEL DELIVERY SERVICE

BACKGROUND

Field of the Invention

This invention relates to package delivery systems.

Background of the Invention

Electronic commerce, commonly known as e-commerce, is increasing at rapid rates and shows no signs of slowing down. This increase in e-commerce has been accompanied by an increase in demand for parcel delivery services to move goods purchased online to their final destinations.

Traditional parcel delivery services rely on static physical addresses to plan and execute efficient package delivery. Package recipients must accommodate the parcel delivery service to ensure the secure and timely receipt of their packages. To this end, many parcel delivery service carriers require that a person authorized to receive the package be physically present to acknowledge package receipt, especially where high-value or high-volume items are being delivered. If an authorized person is not present to accept delivery, package delivery may be delayed until another day, or the intended recipient may be required to pick up the item from a retail location of the parcel delivery service carrier.

Failed deliveries thus result in both inconveniences to the intended recipient and inefficiencies to the parcel delivery service carrier. Even successful deliveries, however, are associated with certain inconveniences as intended recipients must arrange their schedules to be physically present and available at a defined location during a certain period of time.

Accordingly, what are needed are systems and methods to provide secure and timely parcel delivery to unattended locations. Ideally, such systems and methods would permit parcel delivery service carriers to dynamically modify a location for parcel delivery according to the convenience of the customer. Such systems and methods may also automatically authenticate an item at the delivery location, and verify delivery and security of the item at unattended locations to provide customer convenience without compromising parcel security.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
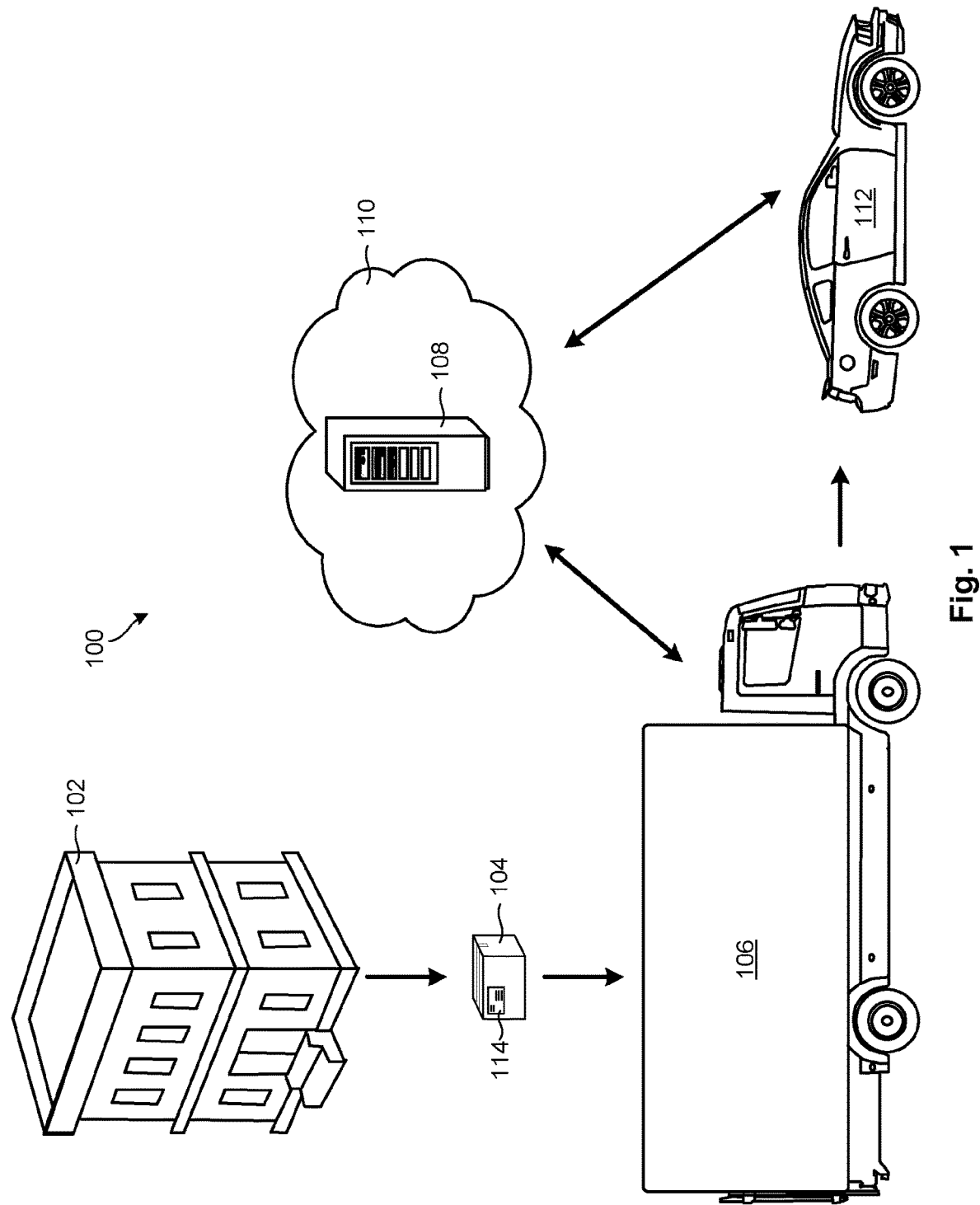
FIG. 1 is a high-level schematic diagram of one embodiment of unattended parcel delivery service in accordance with the invention.

Referring to FIG. 1, the success of e-commerce has led to an ever-increasing demand for parcel delivery services. While the capstone of e-commerce is customer convenience, however, traditional parcel delivery services often fall short when it comes to providing the ease and convenience customers have come to desire and expect. Indeed, customer convenience tends to take a backseat to the traditional parcel delivery service goals of parcel security and timely delivery of items within a scheduled time frame.

This inherent incompatibility between e-commerce objectives and parcel delivery service priorities means that customers may be disappointed when an item scheduled to arrive on a certain day is unexpectedly delayed because no one is available to receive the item when it is delivered. Indeed, for security reasons, many parcel delivery services will refuse to deliver an item if it is unattended at the place of delivery. Intended recipients may be even more upset to find that they must now go out of their way to pick up the item from the parcel delivery service retail location, or wait for re-delivery at a future, likely also inconvenient, time.

Customers often turn to e-commerce to ensure fast delivery of items without the associated hassles and inefficiencies of physically going to a store and shopping. Delayed parcel delivery vitiates the purpose of e-commerce by causing the same kinds of inconveniences (i.e. delayed receipt of items, need to run errands) e-commerce shoppers try to avoid.

As used herein, the term "vehicle" refers to any passenger vehicle, including a heavy-duty industrial or transport vehicle, bus, truck, car, cart, all-terrain vehicle, motorcycle, airplane, and the like. A vehicle may be gas-powered, electric, hybrid, or powered by any other means known to those in the art.

Unattended parcel delivery service 100 in accordance with embodiments of the present invention is designed to facilitate secure and timely parcel delivery to an unattended, dynamically determined location, such as a customer's vehicle 112. As shown, a parcel delivery facility 102 such as a wholesaler, retailer, postal service facility, private package delivery facility, or the like, may package, sort, and/or label items for delivery. In some embodiments, one or more items may be contained in a parcel 104, and a delivery location for the parcel 104 may be identified and/or encoded in a label 114 affixed thereto. The label 114 may include, for example, a bar code, a QR code, a maxi code, or the like.

The label 114 may also include other delivery instructions or information, such as instructions for accessing a gated community, alternative delivery locations, instructions for delivery to an unattended location such as a secure dropbox, or delivery to a vehicle or other mobile location. In certain embodiments, the label 114 may include customer identification information, vehicle identification information, order identification information, and the like.

The parcel delivery service facility 102 may sort parcels 104 for delivery based on their intended delivery locations. Parcels 104 destined for the same area or vicinity may be inventoried and loaded onto a delivery service vehicle 106 for delivery.

In some embodiments, the label 114 affixed to a parcel 104 may indicate that the intended delivery location is a customer vehicle 112. A customer vehicle 112 may be a definite or fixed delivery location if the vehicle 112 is scheduled to be parked in an identified location for a certain period of time, such as when the customer is at work. Alternatively, the label 114 may indicate that the delivery location is indefinite or dynamic. In this case, movement of the customer vehicle 112 within a specified geographical region may be expected within a certain time period.

In any case, the delivery service vehicle 106 may request the current location of the customer vehicle 112 from a cloud-based 110 or other server 108 via a cellular network, wireless network, the internet, or the like. The request for current location information for the customer vehicle 112 may be issued prior to deployment of the delivery service vehicle 106 to facilitate the unattended parcel delivery service's 100 ability to create an appropriate delivery route. The server 108 may also periodically or continuously query location information from the customer vehicle 112 during the route, or the customer vehicle 112 may send location information to the server 108 independently, to confirm the customer vehicle 112 location for delivery as the delivery service vehicle 106 proceeds on its route.

Pricing models for delivery may vary depending on the delivery location or delivery type selected. For example, an unattended parcel delivery service 100 may charge a higher price to account for added delivery costs and the added value of extended convenience to the customer when delivery to a customer vehicle 112 is selected. The price may also vary depending on the type of delivery to the customer vehicle 112. If delivery is to a customer vehicle 112 that will be in a specified location for a scheduled window of time, a delivery fee may be lower than if delivery is to a customer vehicle 112 that moves throughout the day with no predetermined schedule.

An unattended parcel delivery service 100 may charge a premium for providing flexible delivery to the customer when, for example, a dynamic customer vehicle 112 that moves throughout the day causes a delivery service vehicle 106 to change its planned schedule or route to accommodate the delivery. Since this scheduling or route adjustment presents an additional cost to the unattended parcel delivery service 100, an increased delivery fee may be charged to the customer. Likewise, an additional fee may be charged if the unattended parcel delivery service 100 coordinates with the customer to modify a planned delivery route for the customer's convenience. The unattended parcel delivery service 100 may also charge an additional fee to allow the customer to intercept the delivery route to retrieve an on-board parcel 104 at the customer's convenience.

Figure 2:
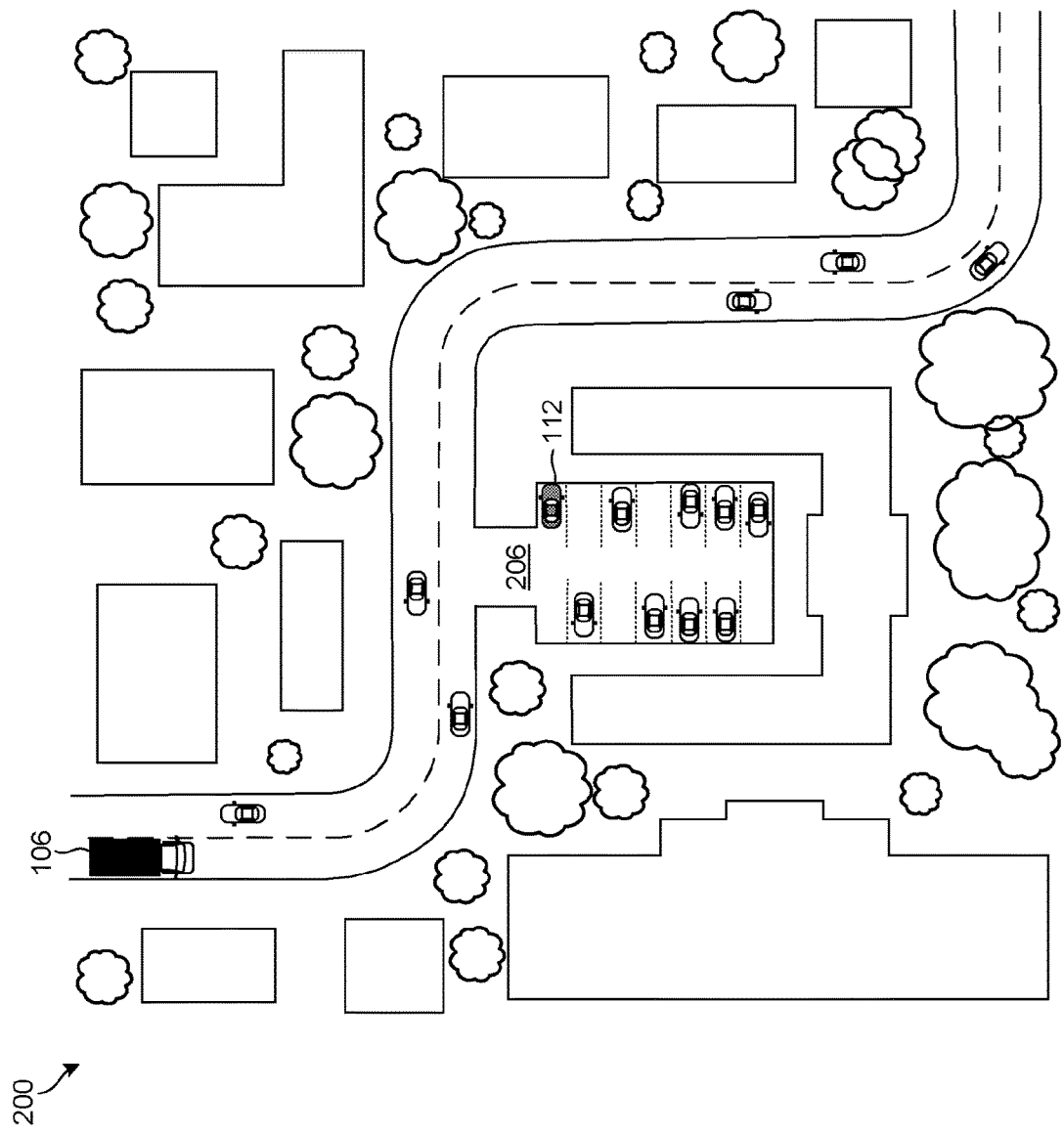
FIG. 2 is a top view of a map depicting one example of unattended parcel delivery service in operation according to the invention.

Referring now to FIG. 2, a delivery route 200 may be flexibly determined to accommodate delivery to one or more customer vehicles 112. In one embodiment, for example, a delivery service vehicle 106 may contain a parcel 104 marked for delivery to a parked customer vehicle 112 in a delivery location 206 identified as a parking lot. The delivery service vehicle 106 may query the customer vehicle 112 at the beginning of the delivery route 200 to verify that the customer vehicle 112 is located in the delivery location 206, and to optimize the delivery route 200 based on that information.

During the course of the delivery route 200, the delivery service vehicle 106 may continue to query the customer vehicle 112 at least periodically to verify the delivery location 206. If the customer vehicle 112 is parked in the parking lot as expected at the time of delivery, the parcel 104 may be delivered to the unattended customer vehicle 112 as discussed with reference to FIGS. 5-7 below. If, however, the customer vehicle 112 moves from the parking lot during the course of the delivery route 200, the delivery service vehicle 106 may either dynamically modify the delivery route 200 to include the new customer vehicle 112 delivery location 206, or may bypass delivery to the customer vehicle 112 and retain the parcel 104 for alternate delivery.

In another embodiment, a parcel 104 may be marked for delivery to a customer vehicle 112 at a specified delivery location 206 and at a scheduled time, or within a scheduled period of time. For example, the customer vehicle 112 may be scheduled to be parked in a parking lot delivery location 206, but only during morning business hours. If the delivery service vehicle 106 is deployed during the scheduled period of time (i.e., morning business hours), then the delivery service vehicle 106 may query the customer vehicle 112 prior to deployment to determine the location of the customer vehicle 112 and utilize this information to create an appropriate delivery route 200.

If, however, the delivery service vehicle 106 is deployed earlier than the scheduled period of time, the delivery route 200 may be created based on the expected delivery location 206. Since the actual customer vehicle 112 delivery location 206 cannot be immediately verified, however, the delivery service vehicle 106 may query the customer vehicle 112 at the beginning of the time period during which the customer vehicle 112 is expected to be stationed at the parking lot or other delivery location 206. After initial confirmation that the customer vehicle 112 is located at the anticipated delivery location 206, the delivery service vehicle 106 may continue to query the customer vehicle 112 to verify its position as the delivery service vehicle 106 nears the delivery location 206.

Figure 3:
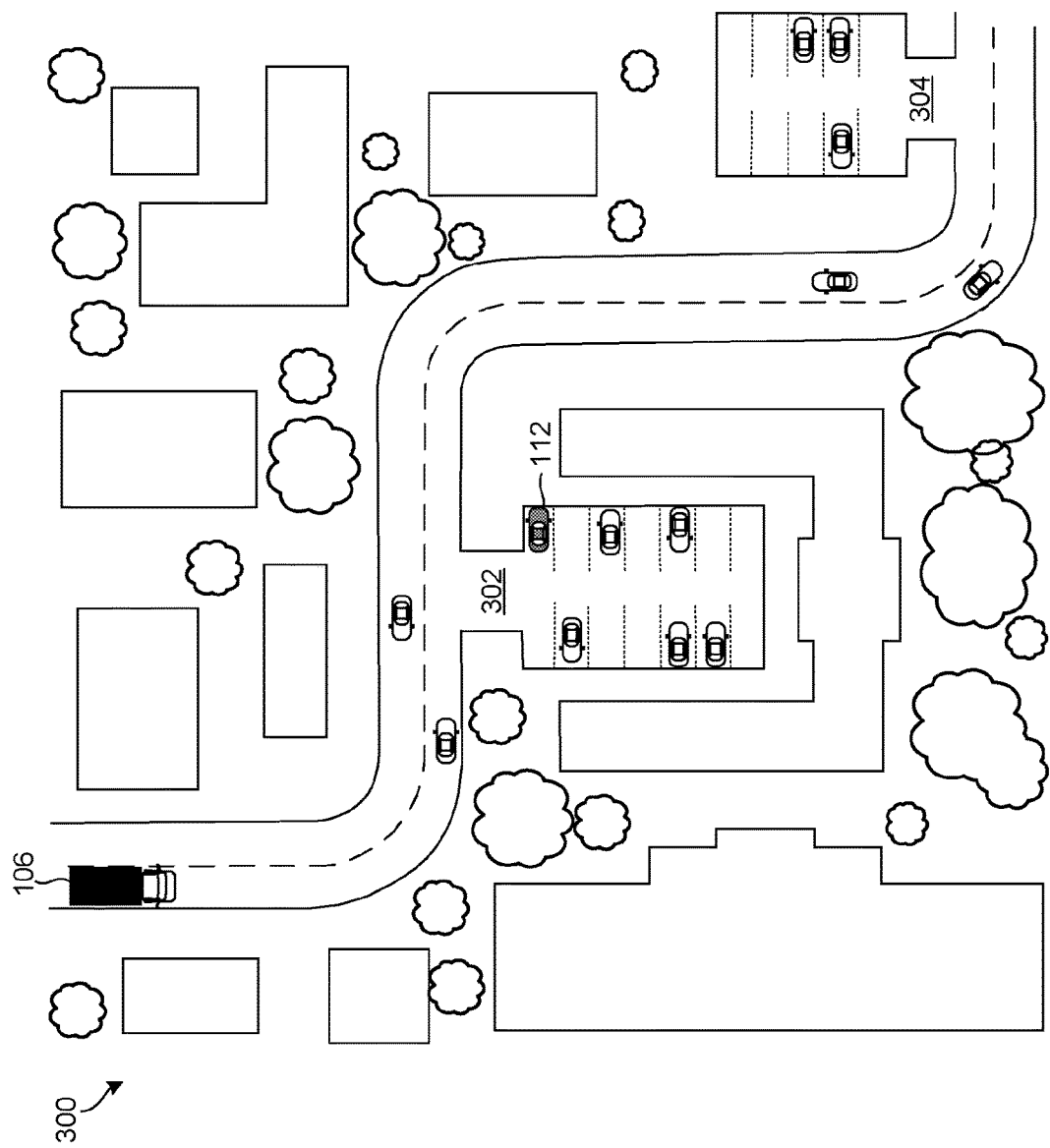
FIG. 3 is a top view of a map depicting another example of unattended parcel delivery service in operation in accordance with the invention.
Figure 4:
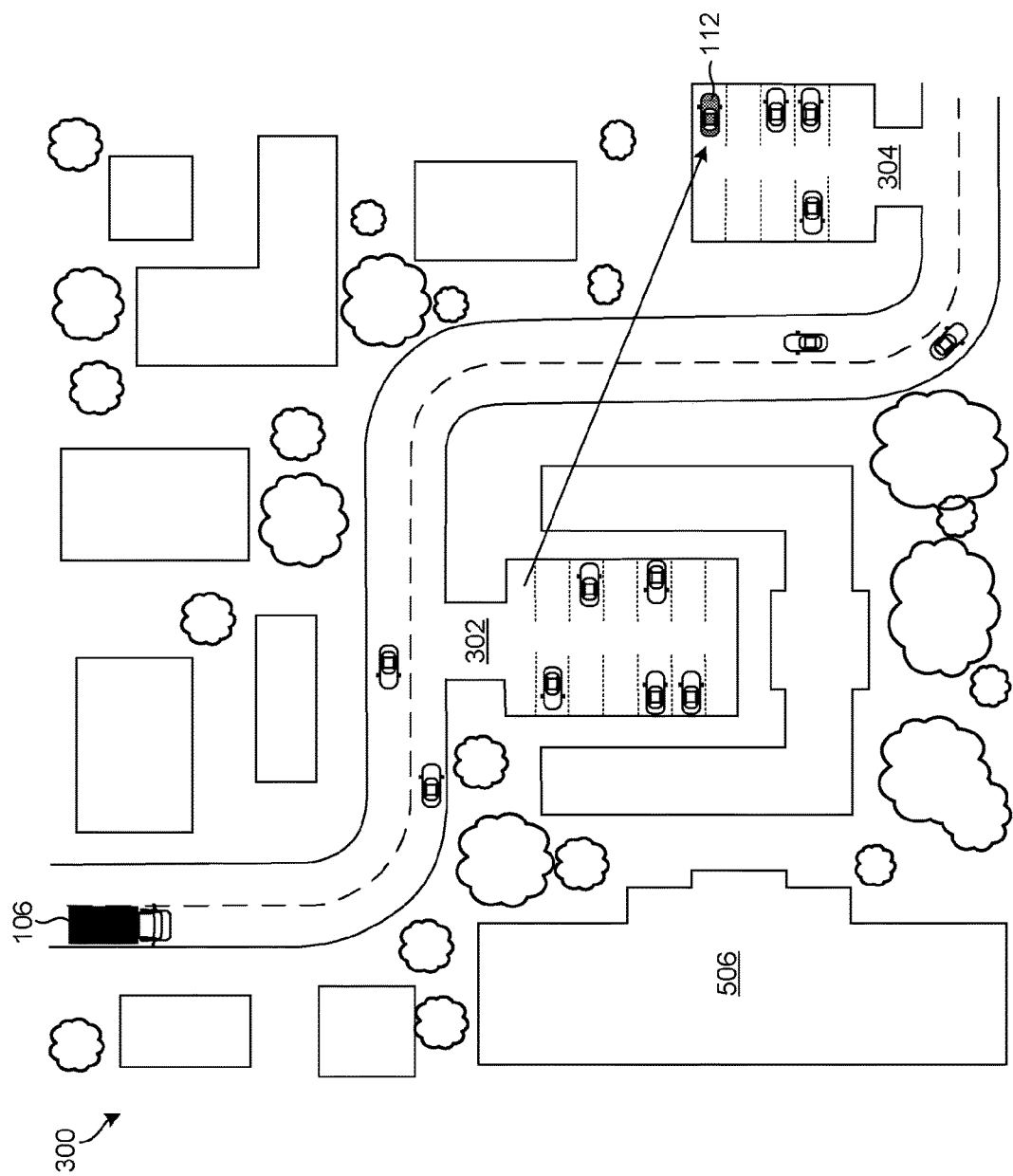
FIG. 4 is a top view of the map of FIG. 3 showing a modified route for parcel delivery in accordance with the invention.

Referring now to FIGS. 3 and 4, in one embodiment, a parcel 104 may be marked for delivery to a mobile or dynamic customer vehicle 112. The label 114 affixed to the parcel 104 may identify a general area 300 (by zip code, for example) in which the customer vehicle 112 is expected to be on a scheduled delivery day. In this manner, the parcel 104 may be initially loaded onto a delivery service vehicle 106 having a route in the general area 300.

Upon deployment, the delivery service vehicle 106 may query one or more cloud-based or other servers for the current location of the customer vehicle 112. The server may then request current location information from the customer vehicle 112. The customer vehicle 112 may utilize a global positioning system ("GPS") or other sensors to identify its current location, and may communicate such information to the server for access by the delivery service vehicle 106. Alternatively, the customer vehicle 112 may independently report its current location to the server, or may report current location information to the server whenever there is a change in customer vehicle 112 location. In any case, the server may access a current location of the customer vehicle 112 and may utilize such information to determine an appropriate delivery route 200.

As shown in FIG. 3, the delivery service vehicle 106 may utilize the current location information returned by the server to create a delivery route 200 that includes a site 302 at which the customer vehicle 112 is located. The delivery service vehicle 106 may periodically or continuously request current location for the customer vehicle 112 thereafter to confirm that the customer vehicle 112 is still located at the site 302 as the delivery service vehicle 106 continues on its delivery route 200.

In some embodiments, as shown in FIG. 4, the customer vehicle 112 may change location from its original site 302 to another area 304. The customer vehicle 112 may independently report this change in location to the server, or may report the change in location in response to a query from the server.

In either case, the delivery route 200 may be modified to exclude the original site 302. In some embodiments, the delivery route 200 may also be flexibly modified to provide additional opportunities for the customer vehicle 112 to rendezvous with the delivery service vehicle 106 to receive the parcel 104. For example, if the new area 304 is in proximity to the original site 302 and/or original delivery route 200, the delivery route 200 may be modified to include the new area 304 at a later time. If, however, modification of the delivery route 200 to include the new area 304 would compromise timely and efficient delivery of other parcels 104 for delivery, the modified delivery route 200 may simply exclude the original site 302, and the parcel 104 may be retained on the delivery service vehicle 106 for alternate delivery at a different time and/or place.

In some embodiments, the delivery service vehicle 106 may notify a customer associated with the customer vehicle 112 of a missed delivery by way of text message, email, social media, or the like. The delivery service vehicle 106 may also provide the customer with the delivery route 200 and approximate arrival times at various locations to permit the customer to intercept the delivery route 200 to retrieve the parcel 104 at the customer's option and convenience.

Figure 5:
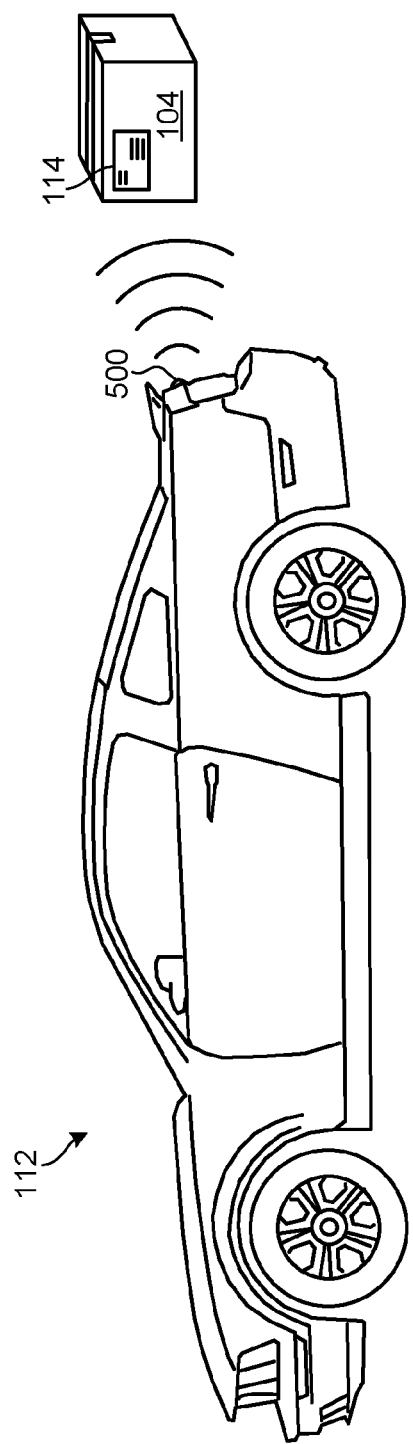
FIG. 5 is a side perspective view of one embodiment of a vehicle configured to authenticate a parcel in accordance with certain embodiments of the invention.

Referring now to FIG. 5, in one embodiment, a sensor 500 may be coupled to or integrated with a customer vehicle 112 to detect and scan a label 114 associated with a parcel 104 for delivery. In some embodiments, the sensor 500 may be one or more of an array of sensors integrated with the customer vehicle 112. The sensor 500 may be a dedicated sensor 500, or may be a multi-use sensor 500 used for various purposes such sensing objects behind the vehicle 112 or sensing environmental conditions for autonomous driving, for example. The sensor 500 may be a simple barcode scanner or QR reader, or may include radar, camera, lidar, or other types of sensing technology known to those in the art.

In operation, the sensor 500 may detect and scan a label 114 affixed to a parcel 104 when the sensor 500 is in proximity thereto. The customer vehicle 112 may use information obtained by the sensor 500 to authenticate the parcel 104 and verify that the parcel 104 is authorized for delivery to the customer vehicle 112. In other embodiments, the information obtained by the sensor 500 may be communicated to a server for authentication, after which the server may respond back to the customer vehicle 112 regarding whether the parcel 104 is authorized for delivery to the vehicle 112.

Figure 6:
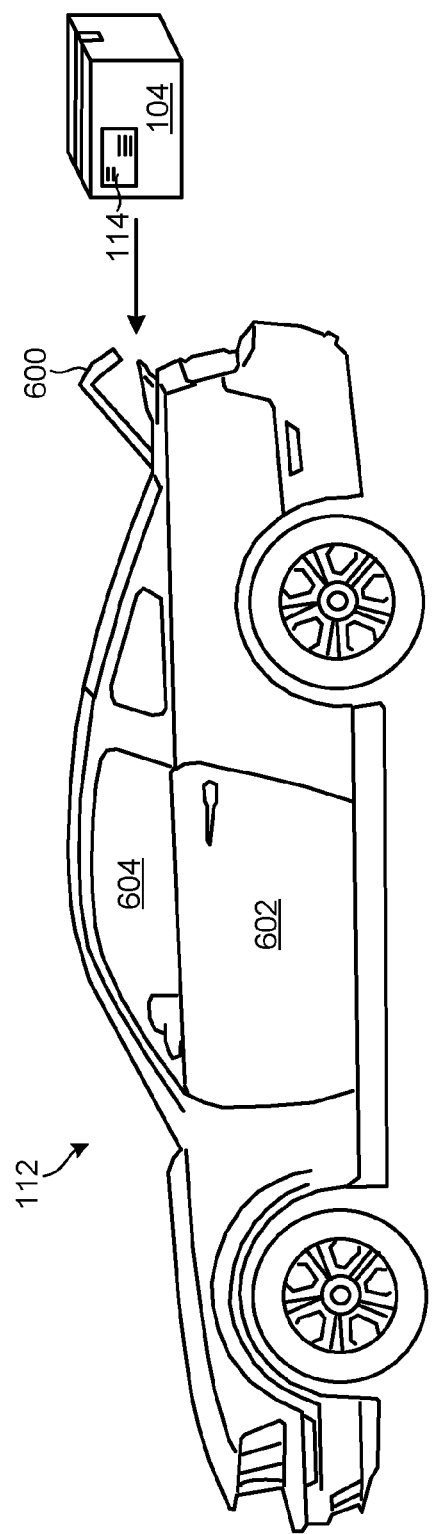
FIG. 6 is a side perspective view of a vehicle configured to provide access to a vehicle for parcel delivery in accordance with certain embodiments of the invention.

Upon proper authentication of the parcel 104, the server may communicate with the customer vehicle 112 to authorize access thereto. As shown in FIG. 6, for example, the server may authorize the customer vehicle 112 to provide access to the parcel 104 by unlocking and/or opening a trunk 600, a vehicle window 604, and/or a vehicle door 602. In certain embodiments, access to the customer vehicle 112 may be limited to unlocking and/or opening the vehicle 112 trunk 600. In this manner, embodiments of the invention may only allow as much access to the vehicle 112 as is necessary to deliver the parcel 104.

In other embodiments, whether access is provided to the trunk 600, vehicle window 604, or vehicle door 602 may depend on the size of the parcel 104 being delivered relative to the size of the customer vehicle 112. For example, in some embodiments, the label 114 may include information identifying the parcel 104 as oversized, requiring access to the backseat of the customer vehicle 112 rather than to the trunk 600. This information may be received by the server when the sensor 500 scans the label 114. In response, the server may authorize access to the interior of the vehicle 112 through one or more vehicle doors 602 instead of the trunk 600.

In still other embodiments, access to the trunk 600, vehicle window 604 or vehicle door 602 may depend on the nature of the parcel 104 being delivered. If the parcel 104 being delivered contains fresh flowers, for example, the trunk 600 may be inadequate to provide adequate protection to the parcel 104. This information may be obtained by the sensor 500 upon scanning an associated label 114 and then sent to the server. Upon proper authentication, the server may authorize access to the vehicle 112 interior through a vehicle window 604. This may allow a delivery person to carefully place the parcel 104 of flowers onto a seat of the customer vehicle 112 through the window, so that the customer may notice the delivery and properly secure the flowers before driving. Access through the vehicle window 604 only, however, may avoid access to the customer vehicle 112 beyond what is absolutely necessary.

Figure 7:
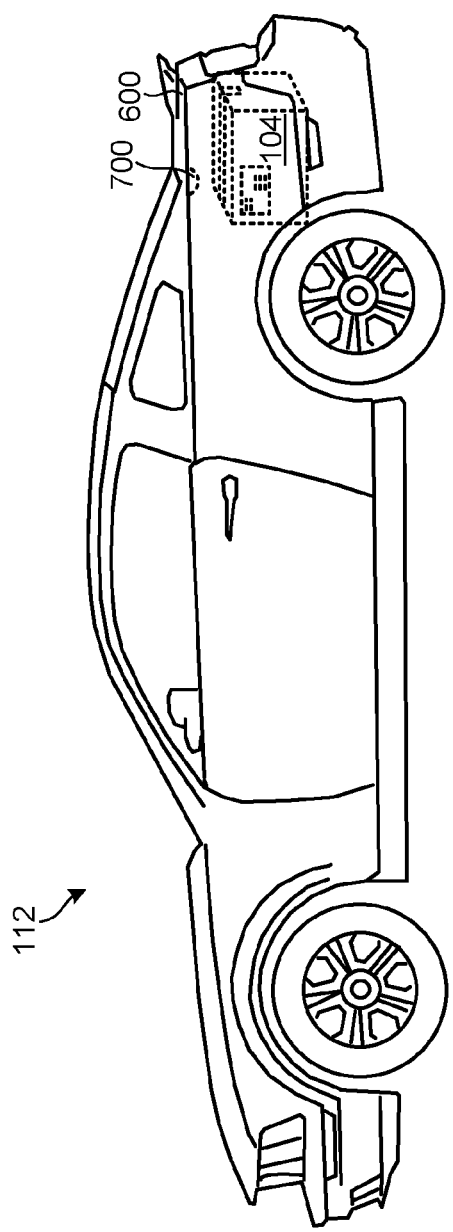
FIG. 7 is a side perspective view of a vehicle configured to verify delivery of an item into a vehicle in accordance with certain embodiments of the present invention.

Referring now to FIG. 7, certain embodiments of the present invention may secure the parcel 104 in the customer vehicle 112, verify parcel 104 delivery, and/or acknowledge the delivery to a customer. In one embodiment, for example, a parcel 104 may be delivered into a trunk 600 of a customer vehicle 112. A verification sensor 700, such as an optical sensor, weight sensor, infrared sensor, or the like, may be coupled to or integrated with an interior of the trunk 600. After the trunk 600 is closed or otherwise secured, the verification sensor 700 may take a picture or otherwise record delivery of the parcel 104 into the trunk 600.

In some embodiments, the verification sensor 700 communicates the information obtained by the verification sensor 700 to a remote server to verify delivery of the parcel 104 into the trunk 600 or other interior compartment of the customer vehicle 112. Upon verification, the server may communicate with the customer vehicle 112 to lock or otherwise secure the trunk 600 or other vehicle 112 access point. The server may then send an acknowledgement to the customer via text message, email, social media, or the like. In some embodiments, the server may send a picture obtained by the verification sensor 700 to the customer as the acknowledgement.

Figure 8:
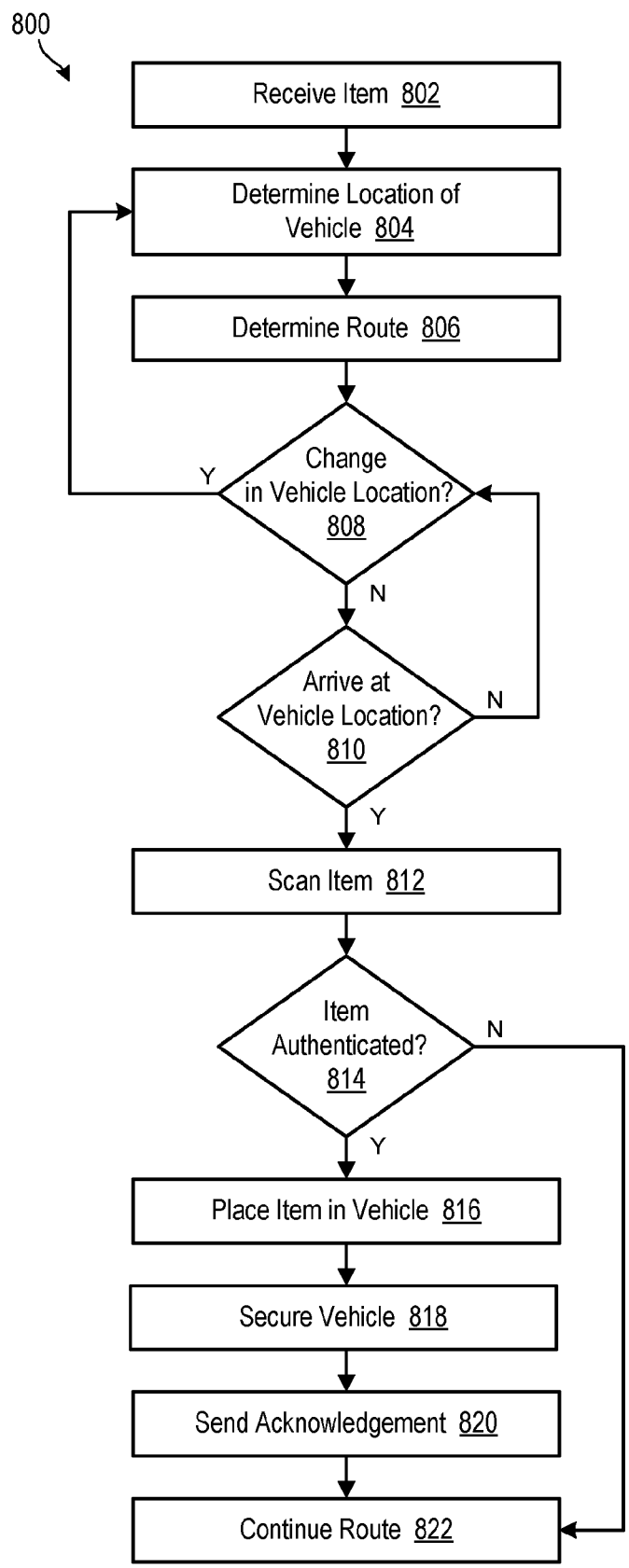
FIG. 8 is a flow chart showing a process for delivering an item to an unattended vehicle in accordance with certain embodiments of the invention.

Referring now to FIG. 8, a method 800 for delivering an item to an unattended vehicle in accordance with embodiments of the present invention may include receiving 802 an item for delivery to a vehicle 112 and determining 804 the location of the vehicle 112. As previously discussed, the location of the vehicle 112 may be determined 804 by querying the vehicle 112 for location information, or by querying a server associated with the vehicle 112 for that information. A delivery route may be determined 806 based on the current location information for the vehicle 112.

Requests for current vehicle 112 location information may continue while a delivery service vehicle 106 is en route. In this manner, any change 808 in vehicle 112 location that might affect the route or route scheduling may be detected and taken into account. Alternatively, the vehicle 112 may independently report a change 808 in its location to the delivery service vehicle 106 or a server in communication therewith. If there is a change 808 in the vehicle 112 location, the current location of the vehicle 112 may again be determined 804. If there is no change 808, the delivery service vehicle 106 may continue on the route until it arrives 810 at the vehicle 112 location.

Upon arrival 810, the parcel 104 or item for delivery may be scanned 812 at the vehicle 112. One or more sensors 500 coupled to the vehicle 112 may scan 812 a label 114 affixed or coupled to the parcel 104 to authenticate 814 the parcel 104 for delivery to the vehicle 112. If the information from the label 114 matches identifying information from the vehicle 112, the item or parcel 104 may be authenticated 814 and the method 800 may continue. If the item or parcel 104 is not authenticated, the item may be retained and the delivery service vehicle 106 may continue 822 on its route.

Upon proper authentication 814, the item may be placed into an interior compartment of the vehicle 112 via a vehicle window 604, vehicle door 602, or trunk 600. The vehicle 112 may be secured 818 after delivery by closing the vehicle window 604, vehicle door 602, or trunk 600. An acknowledgment may then be sent 820 to the customer verifying the delivery. The acknowledgement may be sent 820 to the customer automatically, or may be sent 820 manually by way of a cell phone, handheld device, or other electronic messaging or social media service. The route may then continue 822.

Figure 9:
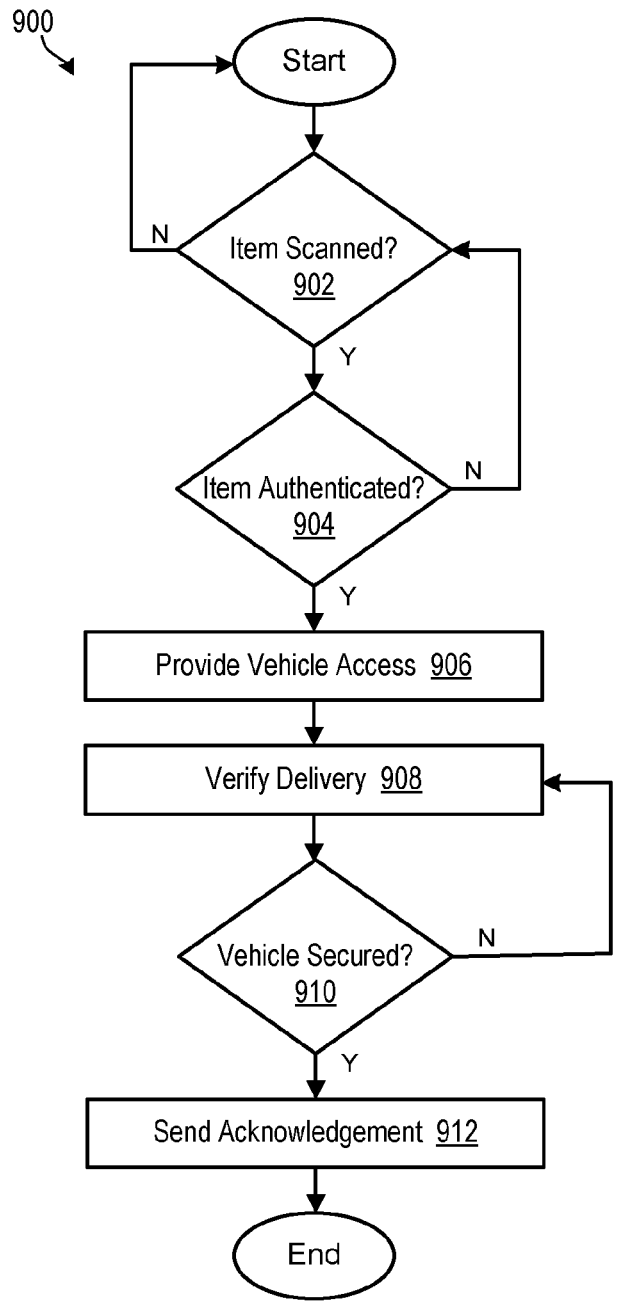
FIG. 9 is a flow chart showing a process for automatically providing item delivery to an unattended vehicle in accordance with certain embodiments of the invention.

FIG. 9 depicts a method 900 for automatically providing unattended parcel delivery in accordance with embodiments of the invention. In certain embodiments, this method 900 may be provided primarily by one or more servers communicating with a delivery service vehicle 106 and a customer vehicle 112.

The method 900 may include querying 902 whether an item has been scanned at a customer vehicle 112. If not, the method 900 may continue to query 902 until an item is scanned. If yes, the method 900 may determine 904 whether the item has been properly authenticated as an item authorized for delivery to the customer vehicle 112. If not, querying 902 for scanned items may continue. If yes, one or more servers may automatically provide 906 vehicle access by, for example, unlocking a vehicle access point such as a vehicle window 604, vehicle door 602, or trunk 600. In some cases, the server may provide an access code or other authorization to a delivery person's cell phone, handheld device, or the like, to enable entry of the code directly onto a keypad or other entry device associated with the customer vehicle 112.

Delivery of the item into the vehicle 112 may then be verified 908 by receiving information, such as a photograph, from a verification sensor 700 associated with the customer vehicle 112. The method 900 may then query 910 whether the vehicle has been secured before sending 912 an acknowledgement to the customer. If the vehicle has not been secured 910, the method 900 may continue to verify 908 delivery of the item into the vehicle 112. If the vehicle 112 has been properly secured 910, an acknowledgement may be sent 912 to the customer by, for example, text message, email, social media, or the like.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   receiving, by a delivery service vehicle, an item for delivery to a customer vehicle;
   determining, by one or more location sensors communicatively coupled to the customer vehicle, a current location of the customer vehicle, wherein the customer vehicle is configured to report the current location of the customer vehicle to a server automatically or responsive to a query from the server or the delivery service vehicle;
   locating, responsive to the customer vehicle reporting the current location of the customer vehicle to the server, the customer vehicle based on the current location;
   determining a price for delivering the item, wherein the price is increased based at least in part on the current location of the customer vehicle having no predetermined schedule;
   notifying, by the delivery service vehicle, a customer associated with the customer vehicle of a delivery route associated with the delivery service vehicle carrying the item and a plurality of arrival times at a plurality of locations associated with the delivery route; and
   automatically obtaining, by an authentication process of the server, access to an interior of the customer vehicle for delivering the item therein, wherein automatically obtaining access to the interior of the customer vehicle comprises unlocking a vehicle access point.

2. The method of claim 1, further comprising acknowledging, to the customer, delivery of the item into the customer vehicle by sending an image obtained by one or more verification sensors operatively coupled to the customer vehicle to the customer.

3. The method of claim 1, wherein the query from the server or the delivery service vehicle comprises a first query of current location information from the customer vehicle.

4. The method of claim 3, wherein, in determining the current location of the customer vehicle, the server or the delivery service vehicle are configured to iteratively query the customer vehicle for current location information to confirm the current location during the delivery route.

5. The method of claim 4, further comprising dynamically modifying the delivery route based on the current location.

6. The method of claim 1, further comprising authenticating, by one or more verification sensors operatively coupled to the customer vehicle, the item at the customer vehicle.

7. The method of claim 6, wherein authenticating comprises scanning, by one of the one or more verification sensors, a code on the item, and wherein the access to the interior of the customer vehicle is determined based on a size of the item, and wherein the code on the item comprises size information indicative of the size of the item.

8. The method of claim 1, further comprising detecting, by one or more verification sensors operatively coupled to the customer vehicle, delivery of the item into the interior of the customer vehicle.

9. The method of claim 8, wherein detecting delivery further comprises securing the customer vehicle after detecting delivery of the item.

10. The method of claim 1, wherein automatically obtaining access to the interior of the customer vehicle further comprises automatically accessing the interior of the customer vehicle through at least one of a window, a door, and a trunk of the customer vehicle, and wherein automatically accessing the interior of the customer vehicle through the window prevents access to the customer vehicle beyond an area necessary for delivery of the item.

11. A system comprising:
at least one processor; and
at least one memory device coupled to the at least one processor and storing instructions for execution on the at least one processor, the instructions causing the at least one processor to:
identify an item for delivery by a delivery service vehicle to a customer vehicle;
determine, by one or more location sensors communicatively coupled to the customer vehicle, a current location of the customer vehicle, wherein the customer vehicle is configured to report the current location of the customer vehicle to a server automatically or responsive to a query from the server or the delivery service vehicle;
generate, responsive to the customer vehicle reporting the current location of the customer vehicle to the server, a delivery route of the delivery service vehicle based on the current location of the customer vehicle;
automatically modify the delivery route of the delivery service vehicle in response to the customer vehicle reporting a change in the current location of the customer vehicle to the server;
determine a price for delivering the item, wherein the price is increased based at least in part on the current location of the customer vehicle having no predetermined schedule;
notify, by the delivery service vehicle, a customer associated with the customer vehicle of the delivery route of the delivery service vehicle and a plurality of arrival times at a plurality of locations associated with the delivery route of the delivery service vehicle; and
automatically obtain, by an authentication process of the server, access to an interior of the customer vehicle for delivering the item therein, wherein automatically obtaining access to the interior of the customer vehicle comprises unlocking a vehicle access point.

12. The system of claim 11, wherein the instructions further cause the at least one processor to acknowledge, to the customer, delivery of the item into the customer vehicle by sending an image obtained by one or more verification sensors operatively coupled to the customer vehicle to the customer.

13. The system of claim 11, wherein the query from the server or the delivery service vehicle comprises a first query of current location information from the customer vehicle.

14. The system of claim 13, wherein, in determining the current location of the customer vehicle, the server or the delivery service vehicle are configured to iteratively query the customer vehicle for current location information to confirm the current location during the delivery route of the delivery service vehicle.

15. The system of claim 11, wherein the instructions further cause the at least one processor to locate, responsive to the customer vehicle reporting the current location of the customer vehicle to the server, the customer vehicle based on the current location.

16. The system of claim 11, wherein the instructions further cause the at least one processor to detect, by one or more verification sensors operatively coupled to the customer vehicle, delivery of the item into the interior of the customer vehicle, and wherein the access to the interior of the customer vehicle is determined based on a size of the item, and wherein the size of the item is determined by at least one of the one or more verification sensors.

17. The system of claim 16, wherein the instructions further cause the at least one processor to secure the customer vehicle after detecting delivery of the item.

18. The system of claim 11, wherein automatically obtaining access to the interior of the customer vehicle further comprises automatically unlocking at least one of a window, a door, and a trunk of the customer vehicle, and wherein automatically obtaining access to the interior of the customer vehicle through the window prevents access to the customer vehicle beyond an area necessary for delivery of the item.

19. The system of claim 18, wherein automatically obtaining access to the interior of the customer vehicle further comprises automatically opening at least one of the window, the door, and the trunk, and wherein automatically obtaining access to the interior of the customer vehicle through the window prevents access to the customer vehicle beyond an area necessary for delivery of the item.

* * * * *